Feb. 4, 1969   C. G. ANSETTE   3,425,093
APPARATUS FOR GROOVING THERMOPLASTIC MATERIAL
Filed April 21, 1966

United States Patent Office 3,425,093
Patented Feb. 4, 1969

3,425,093
APPARATUS FOR GROOVING THERMOPLASTIC MATERIAL
Cyril George Ansette, Ashford, England, assignor to Chemidus Plastics Limited, Ashford, England, a British company
Filed Apr. 21, 1966, Ser. No. 544,234
Claims priority, application Great Britain, Dec. 17, 1965, 53,609/65
U.S. Cl. 18—19    4 Claims
Int. Cl. B29d 23/03; B29c 17/07

ABSTRACT OF THE DISCLOSURE

An apparatus for forming an internal groove or recess in a tube of thermoplastic material comprises a heating means and a means for expanding heat-softened tubing into the interior of a contoured mold.

---

This invention relates to tubing and piping made of thermoplastic material and is directed towards apparatus for forming an internal groove or recess in the tube pipe; the formed groove or recess being intended for the reception of a sealing ring in a manner well known in the art.

The groove or recess is usually formed in a pre-formed socket on a first tube or pipe so that with a sealing ring seated in the groove a second tube or pipe can be inserted into the socket to make a sealed joint.

Whilst it is possible to form various tube and pipe fittings (such as elbows, sockets and the like) by injection moulding, when they are of relatively short length, it has not hitherto been found practicable to form such sockets or shaped parts integrally with a relatively long length of tubing or piping (hereinafter termed "piping") because this rules out injection moulding.

In consequence, where grooves and similar formations are required on a long length of piping, it is generally the practice to make a short specially shaped piece, such as a grooved socket, by injection moulding and then to weld this to a plain length of extruded thermoplastic pipe.

The present invention aims at providing apparatus for forming an annular internal groove or recess in a pipe (or in a socket on the pipe) made of thermoplastic material, irrespective of the fact that such pipe may be longer than can conveniently be formed by injection moulding.

According to the present invention there is provided apparatus for forming an annular internal groove or recess on a length of piping of tubular thermoplastics material which includes a split cavity mould having an internal annular cavity equivalent in shape to the desired external profile of the groove to be formed in the pipe; means for blocking the pipe internally to define a closed annular space at the zone where the groove is to be formed in the pipe; a hollow expansion pressure chamber located in the annulus and means whereby fluid under pressure can pass into the pressure chamber.

In making use of the apparatus according to the present invention, the pipe is blocked internally to define the closed annular space at the zone where the groove is to be formed. In the core of the annular space is located the hollow expansive pressure chamber which is surrounded by a deformable moulding ring of solid elastomeric material to fill the annulus. The moulding ring has an external axial length equal to, or fractionally less than the internal axial length of the groove so that, after having previously heated the pipe to soften it, by pumping fluid under pressure into the expansive pressure chamber the latter is caused to expand and thereby deform the moulding ring to urge it radially outwardly to mould the softened part of the wall of the pipe into the cavity in the mould.

The expansive pressure chamber is preferably made from elastomeric material but it will be realized that other forms of expansive pressure chamber can be utilized, for example a pressure chamber of non-expandable material constructed having walls in concertina form to be capable of expansion when fluid under pressure is pumped therein.

Examples of suitable materials from which the moulding ring and, if desired, the expansive pressure chamber can be made are natural rubbers, synthetic rubbers, neoprene and similar elastomeric materials.

The fluid used for effecting expansion of the pressure chamber can be a gas (preferably air) or a liquid.

During the formation of a socket on a pipe, the wall thickness of the pipe at the socket tends to be relatively decreased; moreover, due to the increase in diameter of the socket, and the fact that it operates at a similar pressure to the remaining length of the pipe, the thermoplastic material at the socket is likely to be overstressed in use.

The disadvantage due to the decrease in wall thickness of the pipe during deformation of the pipe to form the plain socket may be overcome by swaging the pipe end, so as to increase the wall thickness after forming the plain socket. However, it is also desirable to increase the wall thickness of the pipe or of the socket by an extra amount locally, to allow for the formation of the groove or recess to be formed therein.

The wall thickness of the pipe can be increased by an extra amount locally by providing the pipe with a sleeve of thermoplastic material at a position on the pipe at which the socket and/or groove is to be formed. An extruded thermoplastic sleeve of the required length and wall thickness is heated, positioned on the pipe adjacent one end thereof and allowed to cool to shrink on to the pipe. Preferably the interior of the sleeve becomes rigidly attached to the pipe. The combined wall formed by the pipe and the sleeve can then be heated and a plain socket and/or groove formed.

Preferably the operations for forming a groove or recess in an externally thickened pipe socket comprise the sequence of heating the sleeve, shrinking the sleeve on the pipe at the position adjacent one end thereof, heating the mould and combined pipe and sleeve, forming a plain socket of the required length, forming the groove or recess, cooling the mould and combined pipe and sleeve and removing the grooved pipe and sleeve. When the aforementioned sequence of operations is not continuous, i.e. the pipe and sleeve are permitted to cool, then the combined pipe and sleeve are heated prior to each operation preceding the cooling operation.

The invention is particularly applicable to the provision of a groove or recess in pipes such as cold water and rainwater pipes made of polyvinyl chloride and similar materials.

One embodiment of the present invention will now be described, by way of example only, and with reference to the accompanying diagrammatic drawing, in which.

Figure 1:
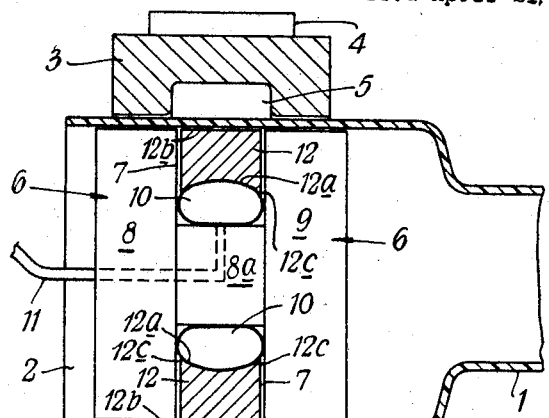
FIG. 1 illustrates an axial cross-section of the end portion of a thermoplastic tubular pipe and apparatus according to the present invention and shows the pipe blocked internally to define a closed annular space prior to deformation of the wall of the pipe into the cavity in the mould.

Referring firstly to FIG. 1, a pipe 1 of tubular thermoplastic material is provided with a socket 2 on which socket is to be formed an annular internal groove or recess. A groove or recess is often required on the socket of a pipe to accommodate an "O-ring" or similar seal which is necessary for making the joint of two interconnecting lengths of piping leakproof. Assembled around the socket 2 is a split cavity mould 3 having clamping means shown generally at 4 and an internal annular cavity 5. The cavity 5 is equivalent in shape to the desired external profile of the finished groove to be formed on the pipe. The split cavity mould 3 is positioned around the socket 2 so that the cavity 5 is located at the place of the socket 2 where the grooved portion of the pipe is to be formed.

The socket 2 is provided with an internal blockage in the form of a mandrel 6 which has an annular recess 7. The recess 7 can conveniently be formed by connecting together two cylindrical members, one of which is provided with a rebate. For example, in the embodiment illustrated the mandrel 6 is constructed from a first cylindrical member 8 having a cylindrical portion 8a of relatively reduced diameter integral and coaxial therewith and extending therefrom, and a second cylindrical member 9 coaxially and rigidly connected to the extension portion 8a by bolts (not shown) or by other convenient means.

It is seen that when the mandrel 6 is located in the socket 2 a closed annular space is formed between the recess 7 and the socket. Located within the core of the annulus formed in the recess 7 to encircle the extension portion 8a is a hollow expansive pressure chamber provided by an elastomeric tube 10 in toroidal form. The tube 10 is inter-connected with an air pump (not shown) by a conduit 11 so that air under pressure from the pump can flow into the elastomeric tube to cause the latter to inflate.

Surrounding the tube 10 is a deformable moulding ring 12 of solid elastomeric material which ring fills the recess 7 and has an external axial length fractionally less than the intended internal axial length of the groove to be formed on the pipe. In its unstressed condition the elastomeric moulding ring 12 has an external diameter slightly less than the internal diameter of the socket 2. The moulding ring 12 has an internal surface 12a which lies adjacent to the tube 10 and is concave in form as illustrated, and an external surface 12b which is preferably cylindrical. It will be realized however that the moulding ring can be provided with an alternatively shaped inner surface which facilitates its method of expansion. The external surface of the moulding ring can be provided of an alternative shape which is governed by the desired shape of the finished groove.

In forming an annular internal groove or recess on the socket 2, the socket is heated at the zone where the groove is to be formed, the split cavity mould assembled around the pipe and the blockage in the form of the mandrel 6 with its associated pressure chamber and moulding ring is positioned in the socket 2 so that the recess 7 is located at the zone where the groove is to be formed— see FIG. 1.

Figure 2:
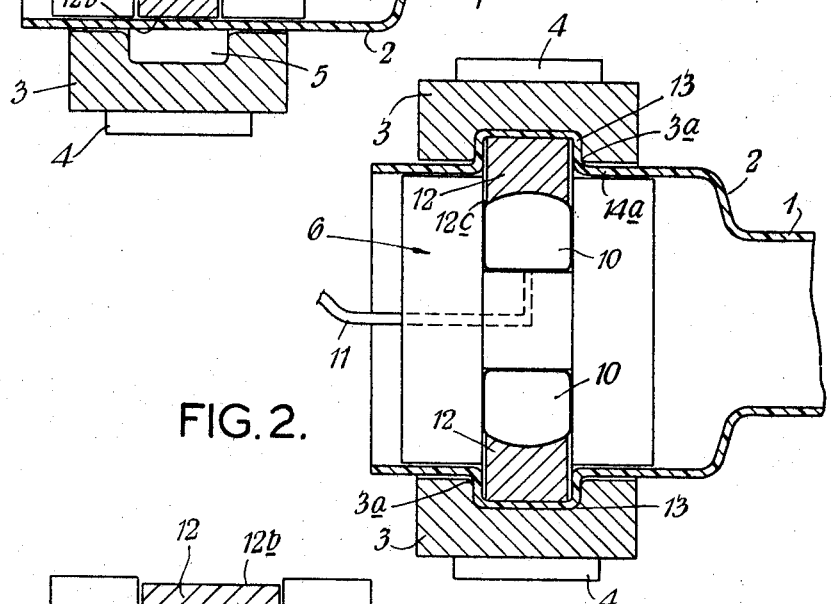
FIG. 2 is a similar cross-section to that in FIG. 1 and illustrates the way in which the wall of the pipe is deformed by relative increase in pressure in the closed annular space and on the internal wall of the pipe.

Referring now to FIG. 2, air under pressure is pumped through the conduit 11 into the tube 10 causing the latter to inflate. Expansion of the tube 10 causes the moulding ring 12 to deform and be urged radially outwardly to mould the softened part of the socket 2 into the cavity 5 of the mould 3, thus forming an annular internal groove or recess 13 on the socket 2. The socket is then cooled until the thermoplastic material is set and the pressurised air then released from the tube 10 to permit the moulding ring 12 to return into the recess 7, after which the mandrel 6 can be removed from within the socket 2. The split cavity mould 3 is finally removed by releasing the clamping means 4.

The internal surface 12a of the moulding ring is preferably of concave form since this both provides a location for the tube 10 in the recess and also ensures that when the tube 10 is inflated or expanded by pumping fluid under pressure therein, the annular internal edges 12c of the moulding ring are urged outwardly to abut the radial side walls of the recess 7, this prevents the tube 10 from "creeping" between the radial side walls of the recess 7 and the substantially radial side walls of the moulding ring 12.

During the deformation of the softened wall of the socket 2 into the cavity in the mould 3, it has been found that the corners 14a of the internal groove or recess 13 so formed in the socket become strained. To reduce such strain on the thermoplastic material at the corners 14a of the groove the edges 3a of the cavity 3 are preferably "rounded-off" as illustrated.

Figure 3:
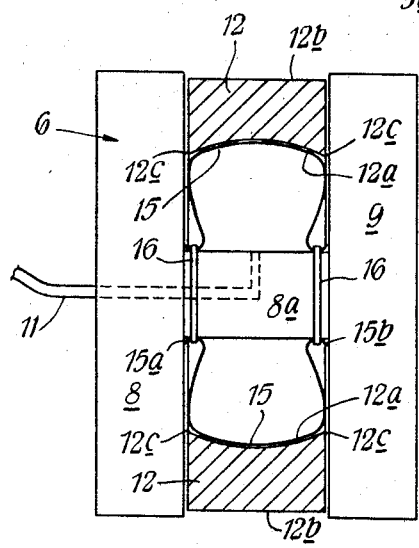
FIG. 3 illustrates an axial cross-section through a modified form of internal blockage suitable for insertion into a pipe.

In FIG. 3, the mandrel 6 and the moulding ring 12 assembly as above described incorporates a modified expansive pressure chamber formed by an annular elastomeric diaphragm 15 of U shaped radial cross-section. The edges 15a and 15b of the diaphragm are securely attached in fluid sealing engagement with the mandrel 6. In the embodiment illustrated the elastomeric diaphragm 15 is securely attached to the extension portion 8a of the mandrel 6 by two circlips 16. It will be realized that the diaphragm 15 can be attached to the mandrel 6 to form an expansive pressure chamber therewith by any suitable manner well known in the art.

What I claim is:

1. Apparatus for forming an annular internal groove on a length of pipe of tubular thermoplastic material which comprises:
    a split cavity mould defining an internal annular cavity equivalent in shape to the desired external profile of the groove to be formed in such pipe;
    means for blocking the pipe internally to define therein a closed annular space at the zone when the groove is to be formed in the pipe;
    means defining a hollow expansive pressure chamber located in said closed annular space at the core thereof;
    a deformable moulding ring of solid elastomeric material surrounding said pressure chamber, and
    means for passing fluid under pressure into said pressure chamber to cause said pressure chamber to expand and to deform said moulding ring and to urge said ring outwardly into said annular cavity of said mould.

2. Apparatus according to claim 1, in which said means for blocking the pipe internally comprises a cylindrically shaped mandrel defining an annular recess therein so that when said mandrel is located in the pipe said closed annular space is formed between the part of said mandrel defining said annular recess and the wall of said pipe,
    said cylindrically shaped mandrel comprising a first cylindrically shaped member having a cylindrical extension portion of relatively reduced diameter integral and co-axial therewith and extending therefrom, and
    a second cylindrical member co-axially and rigidly connected to said extension portion,
    said annular recess being defined between said second member and the annular rebate formed on said first member by said extension portion.

3. Apparatus according to claim 1, wherein said deformable moulding ring is provided with an annular internal surface of concave form.

4. Apparatus according to claim 1, wherein said deformable moulding ring is provided with an annular external surface of cylindrical form.

References Cited

UNITED STATES PATENTS

| 2,014,150 | 9/1935 | Stenerson | 18—17 |
| 2,361,933 | 11/1944 | Ferla | 25—30 |
| 2,815,534 | 12/1957 | Ising | 18—58 |
| 2,826,784 | 3/1958 | Pratt | 18—19 |
| 3,080,269 | 3/1963 | Pollock | 156—187 |
| 3,104,422 | 9/1963 | Branick | 18—19 |

FOREIGN PATENTS 640,219    4/1962    Canada.

ROBERT F. WHITE, *Primary Examiner.*

RICHARD R. KUCI, *Assistant Examiner.*

U.S. Cl. X.R.

249—65; 264—322, 314